United States Patent
Koshy (12)

(10) Patent No.: US 9,647,721 B2
(45) Date of Patent: May 9, 2017

(54) VARIABLE IMPEDANCE SCHEME FOR PROVIDING A WIRED COMMUNICATION

(75) Inventor: Nishil Thomas Koshy, Bangalore (IN)

(73) Assignee: KFX CIRCUITS AND SYSTEMS PRIVATE LIMITED, Karnataka (IN)

( * ) Notice: Subject to any disclaimer, the term of this patent is extended or adjusted under 35 U.S.C. 154(b) by 0 days.

(21) Appl. No.: 14/376,363

(22) PCT Filed: May 31, 2012

(86) PCT No.: PCT/IN2012/000380
§ 371 (c)(1),
(2), (4) Date: Aug. 1, 2014

(87) PCT Pub. No.: WO2013/118135
PCT Pub. Date: Aug. 15, 2013

(65) Prior Publication Data
US 2014/0362981 A1    Dec. 11, 2014

(30) Foreign Application Priority Data

Feb. 6, 2012 (IN) .............................. 438/CHE/2012

(51) Int. Cl.
| | |
|---|---|
| *H04L 25/02* | (2006.01) |
| *H04B 3/30* | (2006.01) |
| *H04N 7/10* | (2006.01) |
| *H04B 3/00* | (2006.01) |
| *H04M 11/06* | (2006.01) |

(Continued)

(52) U.S. Cl.
CPC ................. *H04B 3/30* (2013.01); *H04B 3/00* (2013.01); *H04B 3/50* (2013.01); *H04L 12/2836* (2013.01); *H04L 25/028* (2013.01); *H04L 25/0278* (2013.01); *H04L 25/0286* (2013.01); *H04L 25/0292* (2013.01); *H04L 43/0817* (2013.01);

(Continued)

(58) Field of Classification Search
CPC ....... H04L 25/0278; H04N 7/102; H05B 3/30
See application file for complete search history.

(56) References Cited

U.S. PATENT DOCUMENTS

| | | | | |
|---|---|---|---|---|
| 5,467,455 A | * | 11/1995 | Gay .......................... | H03H 7/40 326/30 |
| 5,898,326 A | * | 4/1999 | Okayasu ................... | H04B 3/04 326/30 |

(Continued)

*Primary Examiner* — Alexander H Taningco
*Assistant Examiner* — Kurtis R Bahr
(74) *Attorney, Agent, or Firm* — Barry Choobin; Patent 360 LLC

(57) ABSTRACT

The various embodiments herein provide a system and method to provide a high speed data transmission over a wired network. The system comprising a transmitting end, a first electrical circuitry provided at the transmitting end to generate an electrical disturbance according to an input signal received from a source network, a receiving end, a second electrical circuitry provided at the receiving end to detect a signal disturbance, to amplify the signal and to regenerate the transmitted signal data from the received signal and a wired network interconnecting the transmitting end and the receiving end. The generated disturbance is transmitted over the wired network using a single conductor as positive spikes, negative spikes or as signals closely resembling the input signal. The receiving end employs a line disturbance detection scheme without necessarily requiring a common ground connection.

7 Claims, 9 Drawing Sheets

(51) Int. Cl.
*H04L 12/28* (2006.01)
*H04L 12/26* (2006.01)
*H04L 29/06* (2006.01)
*H04B 3/50* (2006.01)

(52) U.S. Cl.
CPC .............. *H04L 43/12* (2013.01); *H04L 69/08* (2013.01); *H04M 11/066* (2013.01); *H04N 7/102* (2013.01)

(56) References Cited

U.S. PATENT DOCUMENTS

| | | | | |
|---|---|---|---|---|
| 6,198,307 | B1 * | 3/2001 | Garlepp | H03K 19/0005 |
| | | | | 326/27 |
| 6,331,787 | B1 * | 12/2001 | Whitworth | H04L 25/0278 |
| | | | | 326/30 |
| 2011/0285481 | A1 * | 11/2011 | Huang | H01P 1/22 |
| | | | | 333/81 R |
| 2012/0076256 | A1 * | 3/2012 | Yonemaru | G09G 3/3677 |
| | | | | 377/79 |
| 2012/0223589 | A1 * | 9/2012 | Low | H04B 5/0037 |
| | | | | 307/104 |

* cited by examiner

VARIABLE IMPEDANCE SCHEME FOR PROVIDING A WIRED COMMUNICATION

RELATED APPLICATION

The present application is a national phase application of the International Application PCT/IN2012/000380 filed 31 May 2012, which claims the priority of the Indian Provisional Patent Application No. 438/CHE/2012 filed on 6 Feb. 2012, the entire contents of which are incorporated herein by the way of reference.

BACKGROUND

Technical Field

The embodiments herein generally relate to wired communication systems and methods and particularly relates to a system and method for a high speed data communication through a wired medium. The embodiments herein more particularly relate to a system and method to provide a low distortion high speed data communication over a wired medium by implementing an impedance modulation technique for transmission and reception techniques without requiring a common ground reference.

Description of the Related Art

Generally a wired communication refers to a transmission of data over a wire-based communication technology. The examples for a wired communication network include the telephone networks, a cable television, an internet access, a fiber-optic communication and the like. Also a waveguide, used for high-power applications, is considered as a wired communication scheme.

The public switched telephone network (PSTN) is the network of the world's public circuit-switched telephone networks. The telephone network (PSTN) comprises of telephone lines, fiber optic cables, microwave transmission links, cellular networks, communications satellites and undersea telephone cables, all inter-connected by one or more switching centers.

The network of the fixed-line analog telephone systems is almost entirely digitized in its core and includes mobile as well as fixed telephones. The cable television is a system of providing television programs to the consumers via radio frequency (RF) signals transmitted to the televisions through the coaxial cables or the digital light pulses through the fixed optical fibers located on the subscriber's property. Similarly a FM radio programming, a high-speed Internet, telephony and similar non-television services are also provided by using the RF communication techniques.

The conventional systems for transmitting a data over a wired network, convert the data into an AC signal and further implements a modulation scheme to transmit the AC signal over the wired network. When the modulated signal is transmitted through a wired network, it is attenuated and distorted. Due to an attenuation and distortion, the signal obtained on the receiver end is not similar to the signal fed into the communication system at the transmitter end. The regeneration circuits (repeaters) need to be implemented at short distances over a transmission cable to restrain the distortion and attenuation of the signal. Thus the use of regeneration circuits raises the installation cost of the wired communication network. Also the modulation of a signal requires a power source and a modulator circuit to generate a carrier signal. The use of such power sources in turn increases the installation and maintenance costs.

In view of the foregoing, there is a need to provide a communication scheme for providing a lesser distortion and high speed transmission of data over a wired network. There is also a need for a communication scheme which requires the lesser regeneration circuits for a long distance data transmission over a wired network. Further there is a need of a communication scheme to reduce the power consumption of the wired network during data transmission.

OBJECTS

The primary object of an embodiment herein is to provide a communication scheme using generation and detection of a disturbance for data transmission over a wired network.

Another object of an embodiment herein is to provide a communication scheme that does not necessarily require a modulation circuit at the transmitter end.

Another object of an embodiment herein is to provide a communication scheme to provide high signaling rates over the conventional wired networks.

Yet another object of an embodiment herein is to provide a communication scheme which reduces the rate of power consumption involved in a signal transmission process.

Yet another object of an embodiment herein is to provide a communication scheme to reduce the latency of a transmitted signal over a wired network.

Yet another object of an embodiment herein is to provide a communication scheme that can be implemented using a single conductor as a transmission medium.

Yet another object of an embodiment herein is to provide a communication scheme which is simple and cost effective.

These and other objects and advantages of the embodiments herein will become readily apparent from the following detailed description taken in conjunction with the accompanying drawings.

SUMMARY

The various embodiments herein disclose a system to provide a high speed data transmission over a wired network. The system comprises a transmitting end, a first electrical circuitry provided at the transmitting end to generate an electrical disturbance according to an input signal received from a source network, a receiving end and a second electrical circuitry provided at the receiving end to detect a signal disturbance. The second electrical circuit further amplifies the received signal and regenerates the input signal data from the received signal. A wired network interconnecting the transmitting end and the receiving end is provided. The generated disturbance is transmitted over the wired network using at least a single conductor as the positive spikes and the negative spikes or as the signals closely resembling the input signal. The transmitting end employs an impedance modulation scheme for generation of a signal (disturbance) corresponding to the input signal. The receiving end employs a line disturbance detection scheme without necessarily requiring a common ground connection.

According to an embodiment herein, the first electrical circuitry comprises a switching transistor, a capacitor, an input signal node and a first ground node. The switching transistor is connected to at least one terminal of the wired network to vary an impedance across the terminals for creating the signal disturbance. The capacitor is adapted to represent a gate-drain capacitance of the switching transistor.

According to an embodiment herein, the switching transistor functions as a closed switch when a voltage potential at the input signal node is higher than a predetermined threshold value.

According to an embodiment herein, the switching transistor functions as an open switch when a voltage potential at the input signal node is lower than a predetermined threshold value.

According to an embodiment herein, the variation in the impedance of the switching transistor is directly controlled by the instantaneous voltage applied on the control terminal of the switching transistor. A high voltage applied on the control terminal provides a low impedance of the switching transistor. A low voltage applied, on the control terminal provides high impedance or vice versa, when a P-type transistor is used in the place of an N-type transistor.

According to an embodiment herein, the switching transistor is at least one of an NMOS transistor, a PMOS transistor, a MOSFET transistor, a bipolar transistor or any voltage or current controlled switch.

According to an embodiment herein, the first electrical circuitry comprises switching device with at least two distinct impedance states controlled by the input signal and connected to at least one terminal of the wired network.

According to an embodiment herein, the switching device is a diode.

According to an embodiment herein, the input signal is one of an AC signal or a DC signal, an amplitude, a phase and a frequency of the input signal are varied according to a data obtained from the source network.

According to an embodiment herein, the input signal provided to the transmitting end is digital in nature.

According to an embodiment herein, the second electrical circuitry of the receiving end comprises an inductor placed across the terminals of the wired network to regenerate a voltage signal corresponding to the disturbance transmitted from the transmitting end an output signal node and a second ground node.

According to an embodiment herein, the second electrical circuitry of the receiving end comprises at least one of a capacitor, a resistor or a delay line connected across the terminals of the wired network to detect the signal disturbance at the receiving end.

According to an embodiment herein, the wired network is a cable network comprising at least one of a single conductor, a two-wire cable and a shielded cable with at least one core.

The embodiments herein further provide a method for a high speed data transmission over a wired network. The method comprising the steps of providing an input signal to a transmitting end, generating an electrical disturbance using the input signal, transmitting the signal disturbance over a wired network to a receiving end, detecting the signal disturbance at a receiving end, amplifying the detected signal disturbance and converting the disturbance back to an output signal at the receiving end. The signal disturbance can be transmitted using a single conductor without requiring a second reference wire.

According to an embodiment herein, the impedance of a switching device connected to at least one terminal of the wired network is varied for creating a charge disturbance which is transmitted to the receiving end.

According to an embodiment herein, the signal disturbance at the receiving end is detected by connecting one of an inductor, a capacitor, a resistor or a delay line to at least one terminal of the wired network.

According to an embodiment herein, an impedance across the terminals of the wired network is varied for creating a voltage or a current disturbance which is transmitted to the receiving end.

According to an embodiment herein, a speed of transmission of the input signal is directly proportional to the propagation delay of a switching transistor at the transmitting end.

According to an embodiment herein, a range of the wired network depends on a sensitivity of the receiver and a noise level in a transmitting medium.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
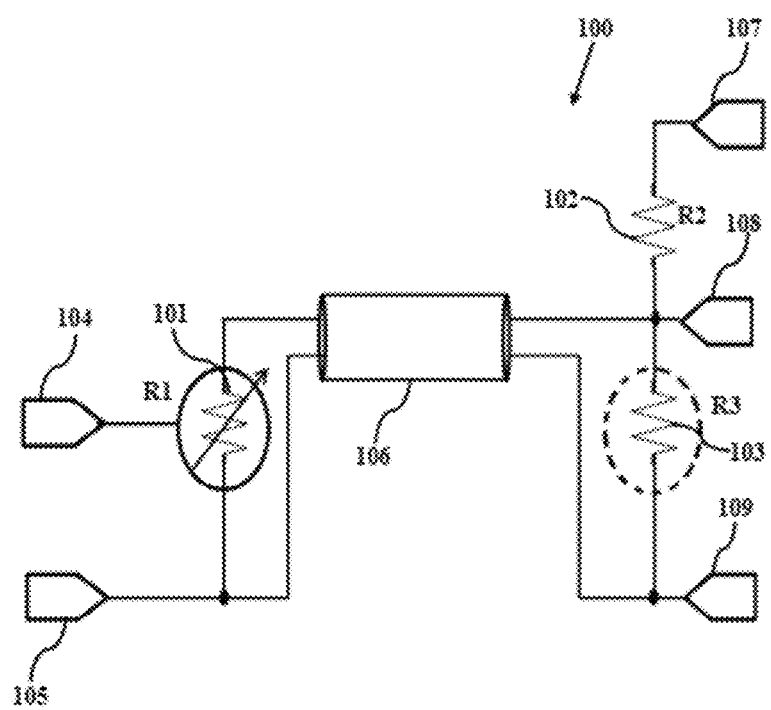
FIG. 1 illustrates a block diagram of a basic electrical system for providing communication over a wired network using impedance modulation, according to a prior art.

Although the specific features of the embodiments herein are shown in some drawings and not in others. This is done for convenience only as each feature may be combined with any or all of the other features in accordance with the embodiments herein.

DETAILED DESCRIPTION

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein disclose a system to provide a high speed data transmission over a wired network. The system comprises a transmitting end, a first electrical circuitry provided at the transmitting end to generate an electrical disturbance according to an input signal received from a source network, a receiving end, a second electrical circuitry provided at the receiving end to detect a signal disturbance. The second electrical circuit further amplifies the received signal and regenerates the input signal data from the received signal. A wired network interconnecting the transmitting end and the receiving end is provided. The generated disturbance is transmitted over the wired network using at least a single conductor as the positive spikes and negative spikes or as the signals closely resembling the input signal. The transmitting end employs an impedance modulation scheme for generating a signal (disturbance) corresponding to the input signal. The receiving end employs a line disturbance detection scheme without necessarily requiring a common ground connection.

According to an embodiment herein, the first electrical circuitry comprises a switching transistor, a capacitor, an input signal node and a first ground node. The switching transistor is connected to at least one terminal of the wired network to vary an impedance across the terminals for creating the signal disturbance. The capacitor is adapted to represent a gate-drain capacitance of the switching transistor.

According to an embodiment herein, the switching transistor functions as a closed switch when a voltage potential at the input signal node is higher than a predetermined threshold value.

According to an embodiment herein, the switching transistor functions as an open switch when a voltage potential at the input signal node is lower than a predetermined threshold value.

According to an embodiment herein, the variation in the impedance of the switching transistor is directly controlled by the instantaneous voltage applied on the control terminal of the switching transistor. A high voltage applied on the control terminal provides a low impedance of the switching transistor. A low voltage applied on the control terminal provides high impedance or vice versa, when a P-type transistor is used in the place of an N-type transistor.

According to an embodiment herein, the switching transistor is at least one of an NMOS transistor, a PMOS transistor, a MOSFET transistor, a bipolar transistor or any voltage or current controlled switch.

According to an embodiment herein, the first electrical circuitry comprises a switching device with at least two distinct impedance states controlled by the input signal and connected to at least one terminal of the wired network.

According to an embodiment herein, the switching device is a diode.

According to an embodiment herein, the input signal is one of an AC signal or a DC signal. Amplitude, phase and frequency of the input signal are varied according to a data obtained from the source network.

According to an embodiment herein, the input signal provided to the transmitting end is digital in nature.

According to an embodiment herein, the second electrical circuitry of the receiving end comprises an inductor placed across the terminals of the wired network to regenerate a voltage signal corresponding to the disturbance transmitted from the transmitting end, an output signal node and a second ground node.

According to an embodiment herein, the second electrical circuitry of the receiving end comprises at least one of a capacitor, a resistor or a delay line connected across the terminals of the wired network to detect the signal disturbance at the receiving end.

According to an embodiment herein, the wired network is a cable network comprising, at least one of a single conductor, a two-wire cable and a shielded cable with at least one core.

The embodiments herein further provide a method for a high speed data transmission over a wired network. The method comprising the steps of providing an input signal to a transmitting end, generating an electrical disturbance using the input signal, transmitting the signal disturbance over a wired network to a receiving end, detecting the signal disturbance at a receiving end, amplifying the detected signal disturbance and converting the disturbance back to an output signal at the receiving end. The signal disturbance can be transmitted using a single conductor without requiring a second common reference wire.

According to an embodiment herein, the impedance of a switching device connected to at least one terminal of the wired network is varied for creating a charge disturbance which is transmitted to the receiving end.

According to an embodiment herein, the signal disturbance at the receiving end is detected by connecting one of an inductor, a capacitor, a resistor or a delay line to at least one terminal of the wired network.

According to an embodiment herein, an impedance across the terminals of the wired network is varied for creating a charge disturbance which is transmitted to the receiving end.

According to an embodiment herein, a speed of transmission of the input signal is directly proportional to the propagation delay of a switching transistor at the transmitting end.

According to an embodiment herein, a range of the wired network depends on a sensitivity of the receiver and a noise level in a transmitting medium.

According to an embodiment herein, the wired network can be coupled to the transmitting and the receiving ends using an AC or a DC coupling.

According to an embodiment herein, a plurality of transmitters and receivers can be connected to the same wired network.

FIG. 1 illustrates a block diagram of a basic electrical system for providing communication over a wired network using impedance modulation, according to a prior art. With a respect to FIG. 1, the electrical system for the communication scheme 100 comprises a variable resistor (R1) 101, an input signal node (tx_in) 104, a ground node (tx_vss) 105 at the transmitter end. The receiver end of the electrical system comprises a resistor (R2) 102, a power source (rx_vdd) 107, an output signal node (rx_out) 108 and a ground node (rx_vss) at the receiver end 109. The transmitting end and the receiving end are connected through a cable network 106.

The input signal node (tx_in) 104 receives a data signal in the form of a periodically or non-periodically fluctuating, voltage or current signals. The variable resistor (R1) 101 is connected between the input signal node (tx_in) 104 and a ground node (tx_vss) 105. The resistor (R1) 101 represents a voltage or current controlled impedance or switch.

The potential at the ground node (rx_vss) 105 is a zero reference potential with respect to the voltage provided at the input signal node (tx_in) 104. Thus the voltage appearing across the variable resistor (R1) 101 is a difference of the corresponding potentials appearing at the input signal node (tx_in) 104 and the zero reference voltage provided at the ground node (tx_vss) 105. The impedance across the resistor (R1) 101 is modulated according to the instantaneous voltage appearing across it. The impedance variation results in the generation of the signal (disturbance) which is transmitted to the receiver end through the wired network, for instance the cable network 106. The signal (disturbance) has either fixed amplitude or continuously varying amplitude over a fixed period.

At the receiver end, the signal (disturbance) is traced and the original data is regenerated from the received signal. An instantaneous voltage appears across the resistor (R3) 103 which is directly proportional to the signal (disturbance) strength. The regenerated voltage signal appears as a potential difference between the output signal node (rx_out) 108 and the ground node (rx_vss) 109.

The resistor (R3) 103 represents a voltage or current controlled impendence or switch. The resistor (R3) 103 is an optional resistor of a larger value than the lower value of the resistor (R1) 101. The signal to be transmitted across the wire is fed at the input signal node (tx_in) 104 and used to control the impedance of the resistor (R1) 101. The resulting impedance change as seen from the receiver end causes the current changes through the resistor (R2) 102 and the optional resistor (R3) 103 and the voltage at the output signal node (rx_out) 108 eventually represents the inverse of a signal in the input signal node (tx_in). Depending on whether the impedance variation of the resistor (R1) 101 is discrete or continuous, this communication scheme can be used to transmit digital or analog signals across the cable network 106. The optional resistor R3 is mainly used to set a preset bias level or reference voltage for an output signal node 108 at the receiver end where this node is further connected to a phase or frequency control circuit. This basic implementation however uses power from the power source (rx_vdd) 107 to charge the wire to a reference voltage and is speed limited due to the RC delays of the cable network 106.

Figure 2:
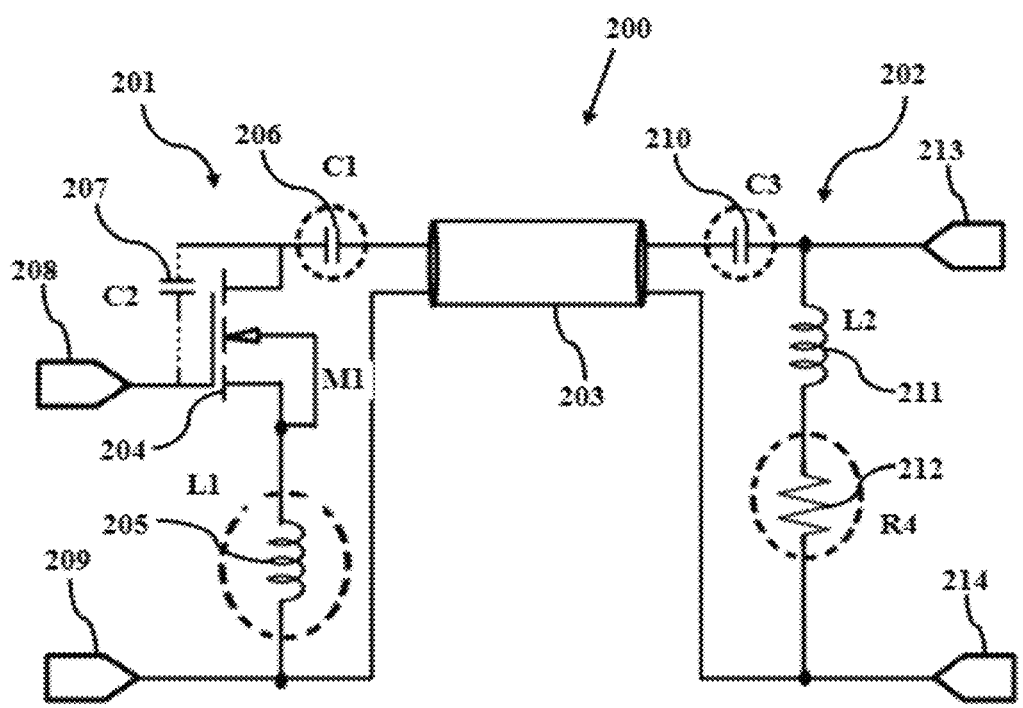
FIG. 2 illustrates a block circuit diagram of a configuration of a NMOS transistor based communication scheme for providing a high speed communication over a wired network, according to an embodiment herein.

FIG. 2 illustrates a block circuit diagram of a transistor based communication scheme for providing a high speed communication over a wired network, according to an embodiment herein. With respect to FIG. 2, the communication system 200 for the transistor based communication scheme comprises a transmitting end 201 and a receiving end 202 interconnected by a wired network 203, such as a cable network. The transmitting end 201 includes an electrical circuitry comprising an NMOS switching transistor (M1) 204, an inductor (L1) 205, a first capacitor (C1) 206, a second capacitor (C2) 207, an input signal node (Tx_in) 208 and a ground node (Tx_Vss) 209. The electrical circuitry of the receiving end 202 comprises a third capacitor (C3) 210, an inductor (L2) 211, a resistor (R4) 212, an output signal node (Rx_out) 213 and a ground node (Rx_Vss) 214.

The input signal node (Tx_in) 208 receives a data signal in the form of a periodically or non-periodically fluctuating voltage or current signals, preferably line encoded to have a constant dc bias. The ground node (Tx_Vss) 209 is a zero reference voltage with respect to the voltage provided at the input signal node (Tx_in) 208. The switching transistor (M1) 204 is connected across one of the terminals of the wired network 203 and the ground node (Tx_Vss) 209, with its control terminal connected to the input signal node (Tx_in) 208. The switching transistor (M1) 204 acts as a closed switch when the potential appearing at the input signal node (Tx_in) 208 is higher than a predetermined threshold value. The switching transistor (M1) 204 acts as an open switch when the potential appearing at the input signal node (Tx_in) 208 is lower than a predetermined threshold value.

When the switching transistor (M1) 204 acts as a closed switch, a part of the input signal node (Tx_in) 208 is coupled to the drain and the source terminals by means of charges injected through the second capacitor (C2) 207. The second capacitor (C2) 207 represents the gate-drain capacitance of the switching transistor (M1) 204. An explicit external impedance (R/L/C) can also be used if the required charge injection is higher than that provided by the capacitor (C2) 207. The simultaneous impedance lowering and charge injection creates a disturbance on the wired network 203 that is in phase with the input signal (Tx_in) 207. The corresponding voltage generated on the transmitting end of the wire can be amplified by means of the optional inductor (L1) 205. The generated disturbance is transmitted over the wired network 203 either as positive and negative glitches or as signals closely resembling the input signal, when the coupling through the second capacitor (C2) 207 is sufficiently high. The MOSFET transistor can also be replaced by a bipolar transistor, or any other voltage or current controlled switch.

At the receiver end 202, the disturbance is converted back into a voltage signal using the inductor (L2) 211 placed across the wired network 203. The resistor (R4) 212 can be connected in series with the inductor (L2) 211 to increase the magnitude of received voltage as long as it does not significantly reduce the current passing through the inductor (L2) 211. The regenerated data signal appears as potential difference between the output signal node (Rx_out) 213 and the ground node (Rx_Vss) 214.

The first capacitor (C1) 206 and the third capacitor (C3) 210 can be implemented for providing an AC coupling with the wired network 203 at the transmitter end 201 and the receiver end 202.

According to an embodiment herein, a switching transistor (M1) 204 is used to short the wires when the input signal is high. Since the transistors automatically couple a part of the gate/control voltage to the other terminals as well, a small current is also injected into the transmitting wires and the are shorted simultaneously, whenever the control voltage is high. The magnitude of voltage across the wire terminal can be increased by placing the optional inductor (L1) 205 at the transmitted end 201 instead of a simple short (ground/earth).

Since the wired network is not being driven to any specific voltage or current levels, this communication scheme uses less power and can be easily used for longer wire lengths without worrying about a loading of the transmitter. Also the signal quality remains high as the signal flow includes only interrogating and detecting a disturbance. The in-phase transmission also results in a lower latency of the transmitter when compared to the conventional transmitters.

Figure 3:
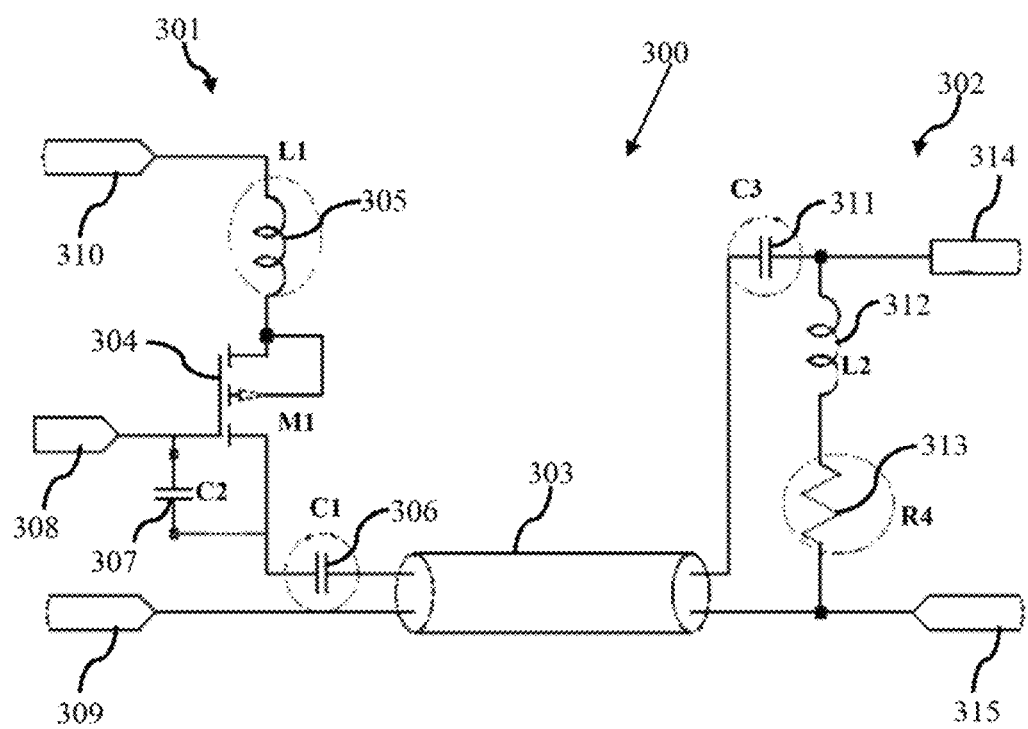
FIG. 3 illustrates a block circuit diagram of a communication scheme employing a PMOS transistor for providing a high speed communication over as wired network, according to an embodiment herein.

FIG. 3 illustrates a block circuit diagram of a communication scheme employing a PMOS transistor for providing a high speed communication over a wired network, according to an embodiment herein. With respect to FIG. 3, the communication system 300 for the PMOS transistor based communication scheme comprises a transmitting end 301 and a receiving end 302 interconnected by a wired network 303, such as a cable network. The transmitting end 301 includes an electrical circuitry comprising a PMOS switching transistor (M1) 304, an inductor (L1) 305, a first capacitor (C1) 306, a second capacitor (C2) 307, an input signal node (Tx_in) 308, a ground node (Tx_Vss) 309 and a power source (Tx_Vdd) 310. The electrical circuitry of the receiving end 302 comprises a third capacitor (C3) 311, an inductor (L2) 312, a resistor (R4) 313, an output signal node (Rx_out) 314 and a ground node (Rx_Vss) 315.

The input signal node (Tx_in) 308 receives a data signal in the form of a periodically or non-periodically fluctuating voltage or current signals, preferably line encoded to have a constant dc bias. The ground node (Tx_Vss) 309 is a zero reference voltage with respect to the voltage provided at the input signal node (Tx_in) 308. The switching transistor (M1) 304 is connected across one of the terminals of the wired network 303 and the power source (Tx_Vdd) 310, with its control terminal connected to the input signal node (Tx_in) 308. The switching transistor (M1) 304 acts as a closed switch when the potential appearing at the input signal node (Tx_in) 308 is lower than a predetermined threshold value. The switching transistor (M1) 304 acts as an open switch when the potential appearing at the input signal node (Tx_in) 308 is higher than a predetermined threshold value.

When the switching transistor (M1) 304 acts as a closed switch, a part of the input signal node (Tx_in) 308 is coupled to the drain and the source terminals by means of charges injected through the second capacitor (C2) 307. The second capacitor C2 307 represents the gate-drain capacitance of the switching transistor (M1) 304. An explicit external impedance (R/L/C) can also be used if the required charge injection is higher than provided by the capacitor (C2) 307. The simultaneous impedance lowering and charge injection creates a disturbance on the wired network 203 that is in phase with the input signal (Tx_in) 307. The corresponding voltage generated on the transmitting end of the wire can be amplified by means of the optional inductor (L1) 305 which is further connected between the power source (Tx_Vdd) 310 and the switching transistor (M1) 304. The generated disturbance is transmitted over the wired network 303 either as positive and negative glitches or as signals closely resembling the input signal, when the coupling through the second capacitor (C2) 307 is sufficiently high. The MOSFET transistor can also be replaced by a bipolar transistor, or any other voltage or current controlled switch.

At the receiver end 302, the disturbance is converted back into a voltage signal using the inductor (L2) 312 placed across the wired network 303. The resistor (R4) 313 can be connected in series with the inductor (L2) 312 to increase the magnitude of received voltage as long as it does not significantly reduce the current passing through the inductor (L2) 312. The regenerated data signal appears as potential difference between the output signal node (Rx_out) 314 and the ground node (Rx_Vss) 315.

The first capacitor (C1) 306 and the third capacitor (C3) 311 can be implemented for providing an AC coupling with the wired network 303 at the transmitter end 301 and the receiver end 302.

As the disturbance transmission through a wired network 303 is similar to a radio signal transmission in a wireless media, any radio signal receiver circuit that operates at a frequency range of signal (disturbance) can be employed at the receiver end 302.

Figure 4:
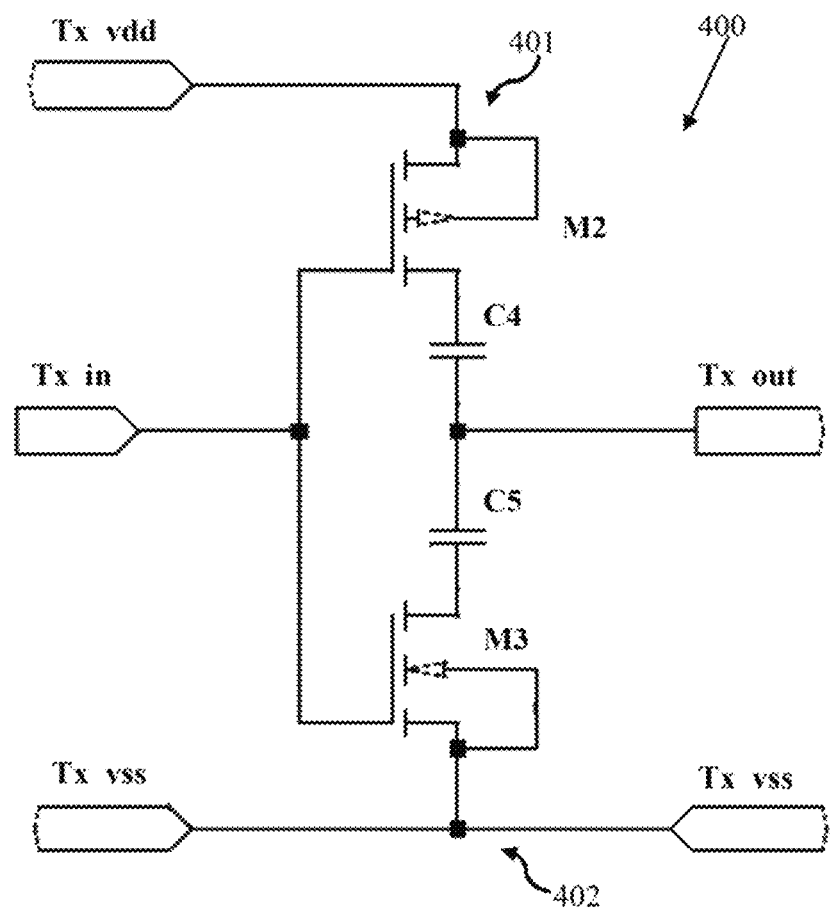
FIG. 4 illustrates a block circuit diagram of a communication scheme using both NMOS and PMOS switches connected together using an AC coupling for providing high speed communication over a wired network, according to an embodiment herein.

FIG. 4 illustrates a block circuit diagram of a communication scheme using both NMOS and PMOS switches connected together using AC coupling capacitor for providing a high speed communication over a wired network, according to an embodiment herein. With respect to FIG. 4, the transmitter configuration comprises a PMOS transistor (M2) 401 connected with a NMOS transistor (M3) 402, together forming a complementary MOSFET transmitter 400 configuration. The complementary MOSFET transmitter 400 configuration is used to generate the signals (disturbances) which are transmitted over a wired network. The AC coupling capacitors (C4 and C5) prevent a DC current from flowing through the transistors resulting in lesser power dissipation than traditional CMOS output drivers.

Figure 5A:
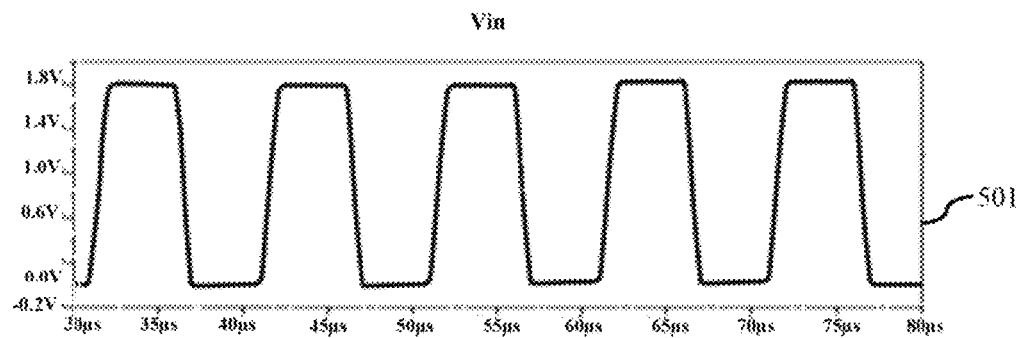
FIG. 5A illustrates a signal wave form of an input signal in a signal transmission and reception scheme through the transistor based communication system according to an embodiment herein.

FIG. 5A illustrates a signal wave form of an input signal in a signal transmission and reception scheme through the transistor based communication system according to an embodiment herein. With respect to FIG. 5A, a graphical representation 501 of the input signal V(in) is shown. The input signal V(in) is provided at the input signal node. The input signal V(in) should be preferably line encoded to avoid a DC bias shift.

Figure 5B:
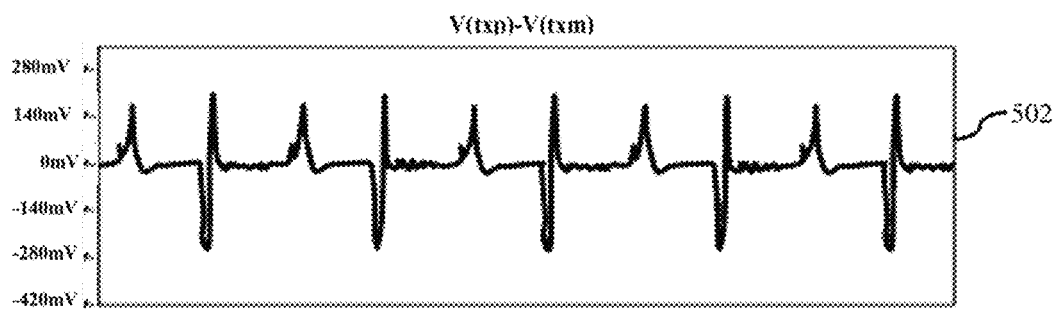
FIG. 5B illustrates a signal wave form of the transmitted signal in a signal transmission and reception scheme through the transistor based communication system according to an embodiment herein.

FIG. 5B illustrates a signal wave form of the transmitted signal in a signal transmission and reception scheme through the transistor based communication system according to an embodiment herein. With respect to FIG. 5B, a graphical representation 502 of the transmitted signal V(Txp)-V(Txm) is shown. The signal (disturbance) V(Txp)-V(Txm) is transmitted over a wired network. The signal (disturbance) V(Txp)-V(Txm) is generally a signal with a frequently varying, amplitude value i.e. it has shape like a noise signal. The signal disturbance V(Txp)-V(Txm) can also closely resemble the input signal when the coupling between the transmitter input and output is sufficiently high.

Figure 5C:
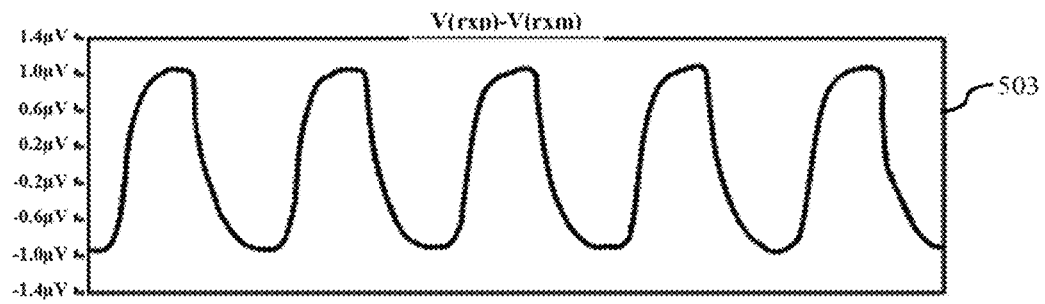
FIG. 5C illustrates a signal wave form of the received signal in a signal transmission and reception scheme through the transistor based communication system according to an embodiment herein.

FIG. 5C illustrates a signal wave form of the received signal in a signal transmission and reception scheme through the transistor based communication system according to an embodiment herein. With respect to FIG. 5C, a graphical representation 503 of the regenerated signal V(Rxp)-V(Rxm) is shown. The signal V(Rxp)-V(Rxm) is regenerated signal at the receiver end. The signal strength is amplified by using an amplifier circuit (optional) in conjunction with the electrical circuitry at the receiving end.

Figure 6:
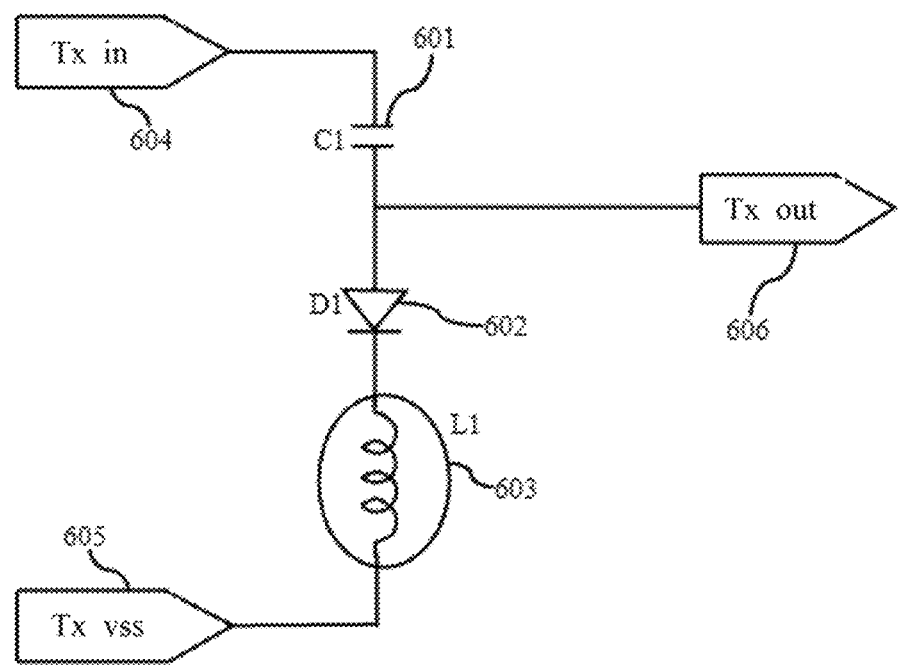
FIG. 6 illustrates a schematic block circuit diagram of a transmitter with a switching diode for providing a high speed communication over a wired network, according to an embodiment herein.

FIG. 6 illustrates a schematic block circuit diagram of a transmitter with a switching diode for providing a high speed communication over a wired network according to an embodiment herein. With respect to FIG. 6, the switching diode based transmitter comprises a capacitor (C1) 601, a diode (D1) 602, an inductor (L1) 603, an input signal node (Tx_in) 604, a ground node (Tx_Vss) 605 and an output signal node (Tx_Out) 606. The diode resistance of diode (D1) 602 suddenly drops very significantly when it receives a positive bias voltage. The capacitor (C1) 601 is connected across the terminals comprising, the input signal node (Tx_in) 604 and the diode (D1) 602. The capacitor (C1) 601 is further connected to the output signal node 606. The capacitor (C1) 601 is used to limit the maximum load detected at the input signal node (Tx_in) 604 independent of the length of the wire connected to the output signal node (Tx_out) 606. The diode (D1) 602 and the inductor (L1) 603 are connected in series with each other.

Moreover the diode (D1) 602 and the inductor (L1) 603 are connected across the terminals comprising the input signal node (Tx_in) 604 and the ground node (Tx_Vss) 605. The diode (D1) 602 is provided at the transmitter end to conduct the signal in the positive half of the input signal and do not conduct in the negative half of the input signal thereby acting like a voltage controlled switch. This represents the easiest way to convert any digital electrical signal into a disturbance that can be propagated on a single conductor.

Figure 7:
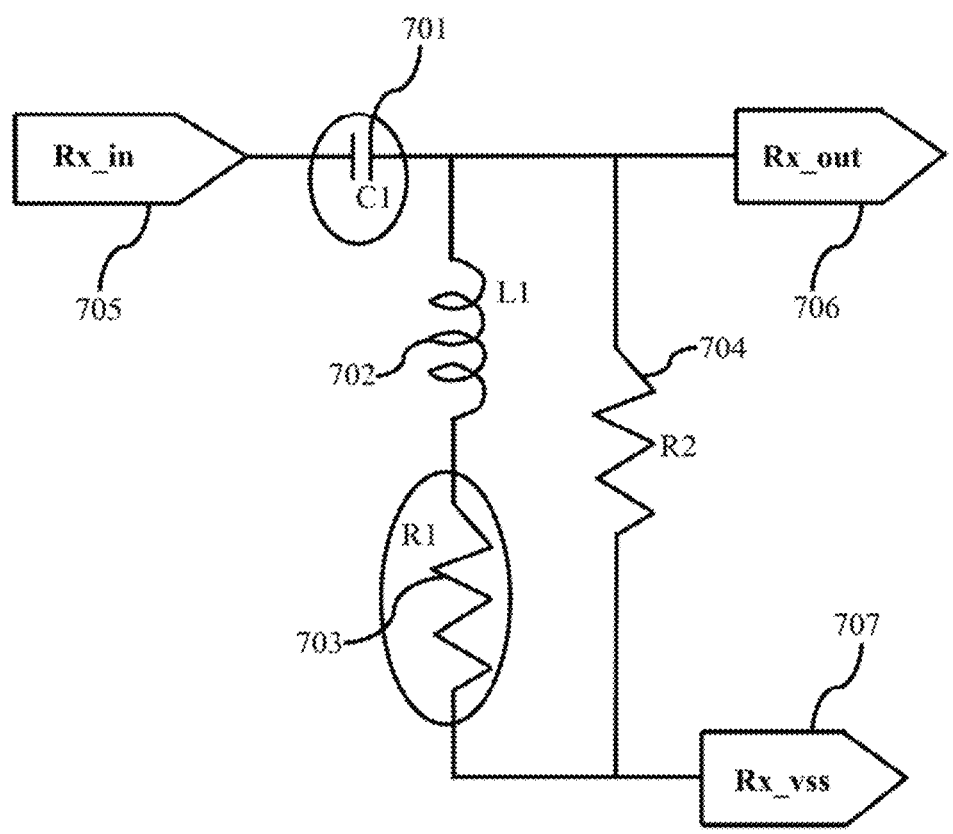
FIG. 7 illustrates a block circuit diagram of an inductor based receiver for detecting the single conductor line disturbances, according to an embodiment herein.

FIG. 7 illustrates a block circuit diagram of an inductor based receiver for detecting the single conductor line disturbances according to an embodiment herein. With respect to FIG. 7, the inductor based receiver comprises a capacitor (C1) 701, an inductor (L1) 702, a resistor (R1) 703, a resistor (R2) 704, an input signal node (Rx_in) 705, a ground node (Rx_Vss) 707 and an output signal node (Rx_out) 706. The capacitor (C1) 701 is connected in series with the input signal node (Rx_in) 705. The capacitor (C1) provides an AC coupling, between the input signal node (Rx_in) 705 and the output signal node (Rx_out) 706. The resistor (R1) 703 is connected in series with the inductor (L1) 702 to increase the magnitude of the received voltage. The resistor (R2) 704 is connected across the receiving terminal to eliminate the open circuit characteristics in the single wire communication.

Figure 8:
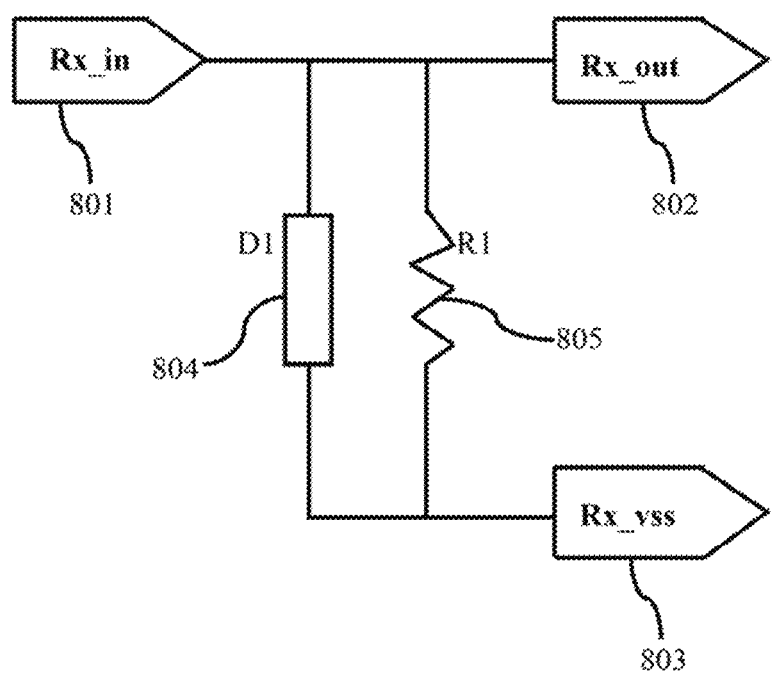
FIG. 8 illustrates a block circuit diagram of a receiver with a delay line for providing a high speed communication over a wired network according to an embodiment herein.

FIG. 8 illustrates a block circuit diagram of a receiver with a delay line for providing a high speed communication over a wired network according to an embodiment herein. With respect to FIG. 8 the receiver comprises an input signal node (Rx_in) 801, an output signal node (Rx_out) 802, a ground node (Rx_Vss) 803, a delay line (D1) 804 and a resistor (R1) 805. The delay line (D1) 804 and the resistor (R1) 805 are connected in parallel to each other. The input signal node (Rx_in) 801 is connected to the delay line (D1) 804. The delay line (D1) 804 provides a local ground reference point for the received signal. The strength of the signal across the delay line (D1) 804 depends on the amplitude of the incoming disturbance wave, its wavelength and the attenuation provided by the delay line (D1) 804. The detected input signal is transmitted to the resistor (R1) 805 connected across the terminals consisting of the output signal node (Rx_out) 802 and the ground node (Rx_Vss) 803.

Figure 9:
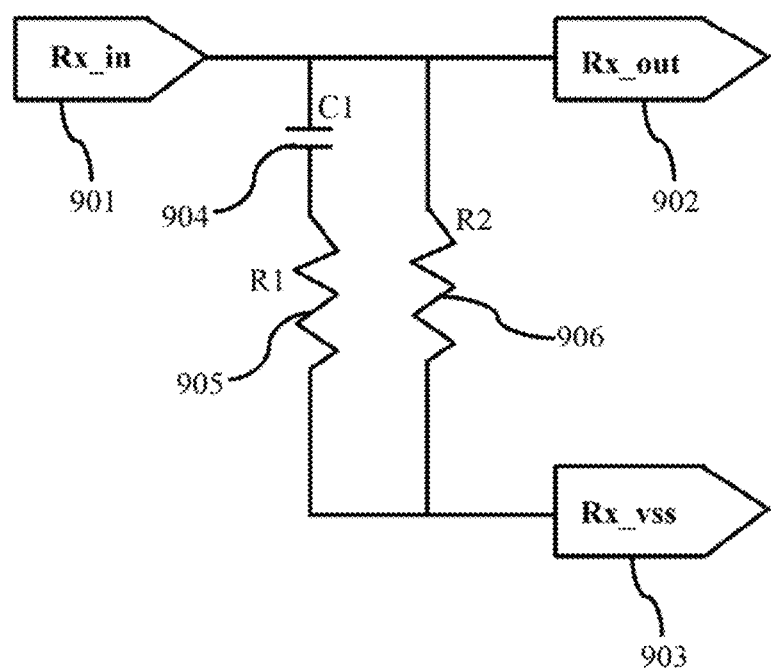
FIG. 9 illustrates a block circuit diagram of a capacitor based receiver for providing a high speed communication over a wired network according to an embodiment herein.

FIG. 9 illustrates a block circuit diagram of a capacitor based receiver for providing a high speed communication over a wired network according to an embodiment herein. With respect to FIG. 9, the capacitor based receiver comprises an input signal node (Rx_in) 901, an output signal node (Rx_out) 902, a ground node (Rx_Vss) 903, a capacitor (C1) 904, a resistor (R1) 905 and a resistor (R2) 906. The capacitor 904 and the resistor (R1) 905 are connected in series with each other. The series connection of the capacitor (C1) 904 and the resistor (R1) 905 are connected in parallel with the resistor (R2) 906. The capacitor (C1) 904 converts the voltage variations on the input signal node (Rx_in) 901 into the current signals that charge and discharge the capacitor (C1) 904. The signal produced by a charging and a discharging of the capacitor (C1) 904 is transmitted in series to the resistor (R1) 905 and the combined signal is transmitted across the resistor (R2) 906. The resistor (R2) 906 is further connected across the terminals including the output signal node (Rx_out) 902 and the ground node (Rx_Vss) 903.

This variable impedance modulation scheme effectively provides a wired communication equivalent to the radio waves propagating through air/space. This also enables the commonly used radio receiver circuits to be used to receive the signal or to restore the signal strength. It also offers the possibility of true one wire communication with the return ground line being replaced by the local earth connections at both the ends. For a given transmission frequency, a high power transfer between the transmitter and receiver can also be achieved using the resonant circuits at the receiver.

The speed at which data can be transmitted using this scheme depends primarily on the propagation delay of the transistor and not its drive strength, while the range (maximum wire length) primarily depends on the receiver sensitivity and the noise level in the transmitting medium. This enables even poor conducting medium such as human skin amongst others to be used as the transmitting medium. The option of an AC coupling between the transmitter and receiver also enables the communication scheme to be used for a wired transmission medium connected to the multiple transmitters and receivers thereby connecting the multiple devices to a single power bus for communicating with each other without the need for any additional wires.

The various embodiments herein performs a partial coupling of the signal voltage/current from the control terminal to the terminals connected across the wire either by relying on the device parasitic or explicitly adding the external components.

The device parasitic of active devices can also be used in place of explicit RLC components to detect the signal disturbance at the receiving end.

The use of AC coupling for both the transmitter end and the receiver end enables the multiple transistors and receivers to be connected on the same wire without affecting its DC operating point.

By using the multiple transmitters in parallel for generating the disturbances with different amplitudes (by varying L1, M1 or C2), it is possible to generate the equivalent of amplitude modulated signals for transmission.

The embodiments herein also enable the use of BJT option instead of MOSFET transistors for creating a communication scheme for wired network transmission.

Although the embodiments herein are described with various specific embodiments, it will be obvious for a person skilled in the art to practice the embodiments herein with modifications. It is also to be understood that the description is intended to cover all of the generic and specific features of the embodiments described herein and all the statements of the scope of the embodiments which as a matter of language might be said to fall there between.

What is claimed is:

1. A system to provide data transmission over a wired network, the system comprising:
a transmitting end having a first electrical circuitry, said first electrical circuitry configured to generate an electrical disturbance according to an input signal received from a source network, wherein the first electrical circuitry comprises a switching transistor connected to at least one terminal of the wired network to vary an impedance across the terminals for creating a signal disturbance, a capacitor configured to represent a gate-drain capacitance of the switching transistor, an input signal node, and a first ground node;
a receiving end having a second electrical circuitry, said second electrical circuitry configured to detect a signal disturbance, to amplify the signal disturbance and to regenerate the input signal data from the received signal, wherein the second electrical circuitry of the receiving end comprises at least one of an inductor, a capacitor, a resistor and a delay line connected to at least one terminal of the wired network to regenerate a voltage signal corresponding to the disturbance transmitted from the transmitting end, an output signal node, and a second ground node; and a wired network interconnecting the transmitting end and the receiving end;

wherein the generated electrical disturbance is transmitted over the wired network using at least a single conductor without requiring a return loop conductor and a common ground connection, and wherein the generated disturbance is transmitted as positive spikes or negative spikes as signals closely resembling the input signals, and wherein the switching transistor in the first electrical circuitry comprises at least two distinct impedance states controlled by the input signal, and wherein the gate-drain capacitance of the switching transistor is configured to simultaneously lower the impedance and inject a charge to create a disturbance that is in phase with the input signal on the wired network.

2. The system of claim 1, wherein the switching transistor functions as a closed switch, when a voltage potential at the input signal node is higher than a predetermined threshold value.

3. The system of claim 1, wherein the switching transistor functions as a open switch, when a voltage potential at the input signal node is lower than a predetermined threshold value.

4. The system of claim 1, wherein the switching transistor is at least one of an NMOS transistor, a PMOS transistor, a MOSFET transistor, a bipolar transistor, a voltage controlled switch and a current controlled switch.

5. A method to provide data transmission over a wired network, the method comprising the steps of:

providing an input signal to a transmitting end;

generating an electrical disturbance, at a first electrical circuitry, using the input signal;

transmitting the signal disturbance over a wired network to a receiving end;

detecting the signal disturbance at the receiving end, using a second electrical circuitry;

amplifying the detected signal disturbance; and converting the disturbance back to an output signal at the receiving end;

wherein the signal disturbance is transmitted using a single conductor without requiring a return loop conductor and a common ground connection, and wherein the generate disturbance is transmitted as positive spikes or negative spikes GP as signals closely resembling the input signals, and wherein the impedance is lowered and a charge is injected simultaneously through the gate-drain capacitance of the switching transistor to create a disturbance that is in phase with the input signal on the wired network.

6. The method of claim 5, wherein the impedance of a switching device connected to at least one terminal of the wired network is varied for creating a voltage disturbance or a current disturbance which is transmitted to the receiving end.

7. The method of claim 5, wherein a detection of the signal disturbance at the receiving end is done by connecting one of an inductor, a capacitor, a resistor and a delay line to at least one terminal of the wired network.

* * * * *